US005954466A

United States Patent [19]

Coffey et al.

[11] Patent Number: 5,954,466

[45] Date of Patent: Sep. 21, 1999

[54] ANTI-ROTATION CLIP FOR TIGHTENING AND LOOSENING NUTS AND BOLTS

[75] Inventors: Eugene M. Coffey, Bacliff; Robert B. Taylor, Baytown, both of Tex.

[73] Assignee: Muskegon Tools, L.L.C., Muskegon, Mich.

[21] Appl. No.: 09/018,420

[22] Filed: Feb. 4, 1998

[51] Int. Cl.[6] .............................. F16B 39/10; B25B 9/00

[52] U.S. Cl. .............................. 411/119; 411/120; 81/13

[58] Field of Search .............................. 411/119, 120, 411/123, 124; 81/13, 487

[56] References Cited

U.S. PATENT DOCUMENTS

| | | | |
|---|---|---|---|
| D. 305,927 | 2/1990 | Lenderman et al. . | |
| 1,052,380 | 2/1913 | Reel | 411/120 |
| 1,431,832 | 10/1922 | Mills | 81/13 |
| 2,190,075 | 2/1940 | Love | 411/120 |
| 2,664,770 | 1/1954 | Tomchek | 81/13 |
| 4,284,114 | 8/1981 | Korenobu | 411/119 |
| 4,329,097 | 5/1982 | Steele et al. . | |
| 4,735,533 | 4/1988 | Gallagher et al. . | |
| 4,906,150 | 3/1990 | Bennett | 411/120 |
| 4,920,835 | 5/1990 | Hendricks | 81/13 |
| 5,049,117 | 9/1991 | Mikel et al. . | |
| 5,415,509 | 5/1995 | Martin et al. . | |
| 5,429,465 | 7/1995 | Puskas . | |

*Primary Examiner*—Flemming Saether
*Attorney, Agent, or Firm*—Kenneth A. Roddy

[57] ABSTRACT

An anti-rotation clip for preventing rotation of a nut-like member (nut or bolt head) of a flanged connection to facilitate tightening or loosening of the nut-like member and eliminate the need to use two wrenches for tightening or loosening a nut or bolt. The clip is a generally L-shaped member having a horizontal portion and a vertical portion at one end thereof extending generally perpendicular thereto. A polygonal opening extending vertically through the horizontal portion has a plurality of discrete angled sides configured to surround and engage the sides of the nut-like member. The inner surface of the vertical portion is spaced a distance from the opening and is received on the outer surface of a flange with which the nut-like member is associated to prevent rotation of the surrounded nut-like member while torque is applied to a vertically opposed bolt head or nut connected with the surrounded nut-like member such that the nut-like member is prevented from rotating as torque is continued to tighten or loosen the connected nut-like member relative to the opposed bolt head or nut.

8 Claims, 3 Drawing Sheets

ANTI-ROTATION CLIP FOR TIGHTENING AND LOOSENING NUTS AND BOLTS

BACKGROUND OF THE INVENTION

1. Field of the Invention

This invention relates generally to lock devices for preventing rotation of nuts and bolts, and more particularly to an anti-rotation clip that removably engages a polygonal nut or bolt head and the curved exterior of a flange to prevent its rotation and facilitate tightening or loosening of the nut or bolt and eliminate the need to use two wrenches for tightening or loosening a nut or bolt.

2. Brief Description of the Prior Art

In a conventional studded flange connection a plurality of studs having threaded ends extend through the bolt holes of the mating flanges and nuts are threadedly engaged on the threaded ends of the studs. In conventional bolted flange connections a plurality of bolts extend through the bolt holes of the mating flanges and have nuts threadedly engaged on the end opposite the bolt heads.

Installing and removing the nuts and bolts from flanged connections is often difficult, particularly if the flanged connections have been exposed to harsh weather or corrosive elements, such as in oilfields, refineries, and chemical plants. In nearly all situations, it is necessary to use one wrench to hold the nut or bolt head on one side of the connection to prevent it from rotating while applying torque to the nut or bolt head on the opposed side of the connection. It is sometimes difficlut for one person to hold both wrenches and apply sufficient torque with one hand to tighten or loosen the connection.

In the case of flanged connections that been exposed to harsh weather or corrosive elements, such as in oilfields, refineries, and chemical plants, it is common to employ two persons for tightening and loosening the connection. One person holds a wrench to retain the nut or bolt head on one side of the connection to prevent it from rotating while the other person applies torque to the nut or bolt head on the opposed side of the connection with the second wrench. This procedure is time consuming and labor intensive, particularly in oilfields, refineries, and chemical plants, where there may be hundreds of flanged connections to assembled or disassembled.

There are several patents which disclose various devices for locking a nut or bolt to prevent rotation or preventing relative rotation between fastener elements, none of which engage the outer circumference of an associated flange.

Steele et al, U.S. Pat. No. 4,329,097 discloses a pair of nut locking cups that engage the external surfaces of a pair of nuts and have an outside radius equal to one-half of the distances between adjacent studs with a locking bar welded to the cups and between adjacent studs.

Gallagher et al, U.S. Pat. No. 4,735,533 and Linderman et al, Design U.S. Pat. No. Des. 305,927 disclose a locking assembly for locking a nut to a valve body which utilizes a lock plate with a peripheral depending skirt having an opening which surrounds the nut-like portion of a valve bonnet and has a slot spaced from the opening which receives a set screw and a nut to secure the lock plate to the valve body.

Mikel et al, U.S. Pat. No. 5,049,117 and Martin et al, U.S. Pat. No. 5,415,509 disclose an adjustable locking plate with a rectangular central aperture defined by upwardly bent straps and opposed arcuate end edges and opposed arcuate slots which receive bolts.

Puskas, U.S. Pat. No. 5,429,465 discloses a retainer structure for preventing relative rotation between a plurality of spaced apart nut-like fasteners utilizing a plurality of apertured plates each having a central polygonal aperture which is placed on a nut-like fastener and having opposed ends that are cut out to surround one-half of the adjacent nut-like fastener.

The present invention is distinguished over the prior art in general, and these patents in particular by a generally L-shaped anti-rotation clip for preventing rotation of a nut-like member (nut or bolt head) of a flanged connection to facilitate tightening or loosening of the nut-like member and eliminate the need to use two wrenches for tightening or loosening a nut or bolt. The clip has a horizontal portion and a vertical portion at one end thereof extending generally perpendicular thereto. A polygonal opening extending vertically through the horizontal portion has a plurality of discrete angled sides configured to surround and engage the sides of the nut-like member. The inner surface of the vertical portion is spaced a distance from the opening and is received on the outer surface of a flange with which the nut-like member is associated to prevent rotation of the surrounded nut-like member while torque is applied to a vertically opposed bolt head or nut connected with the surrounded nut-like member such that the nut-like member is prevented from rotating as torque is continued to tighten or loosen the connected nut-like member relative to the opposed bolt head or nut.

SUMMARY OF THE INVENTION

It is therefore an object of the present invention to provide an anti-rotation clip for preventing rotation of a nut-like member (nut or bolt head) of a flanged connection to facilitate tightening or loosening of the nut-like member.

It is another object of this invention to provide an anti-rotation clip which will eliminate the need to use two wrenches for tightening or loosening the nuts and bolts of a flanged connection.

Another object of this invention is to provide an anti-rotation clip for preventing rotation of a nut-like member (nut or bolt head) which is quickly and easily installed and removed from the nut-like member.

Another object of this invention is to provide an anti-rotation clip for preventing rotation of a nut-like member (nut or bolt head) which may be tethered to a flanged connection and readily available for use.

A further object of this invention is to provide an anti-rotation clip for preventing rotation of a nut-like member (nut or bolt head) which is rugged and reliable in operation.

A still further object of this invention is to provide an anti-rotation clip for preventing rotation of a nut-like member (nut or bolt head) which is simple in construction and economical to manufacture.

Other objects of the invention will become apparent from time to time throughout the specification and claims as hereinafter related.

The above noted objects and other objects of the invention are accomplished by a generally L-shaped anti-rotation clip for preventing rotation of a nut-like member (nut or bolt head) of a flanged connection to facilitate tightening or loosening of the nut-like member and eliminate the need to use two wrenches for tightening or loosening a nut or bolt. The clip has a horizontal portion and a vertical portion at one end thereof extending generally perpendicular thereto. A polygonal opening extending vertically through the horizontal portion has a plurality of discrete angled sides configured to surround and engage the sides of the nut-like member. The inner surface of the vertical portion is spaced a distance from the opening and is received on the outer surface of a flange with which the nut-like member is associated to prevent rotation of the surrounded nut-like member while torque is applied to a vertically opposed bolt head or nut connected with the surrounded nut-like member such that the nut-like member is prevented from rotating as torque is continued to tighten or loosen the connected nut-like member relative to the opposed bolt head or nut.

DESCRIPTION OF THE PREFERRED EMBODIMENT

Figure 1:
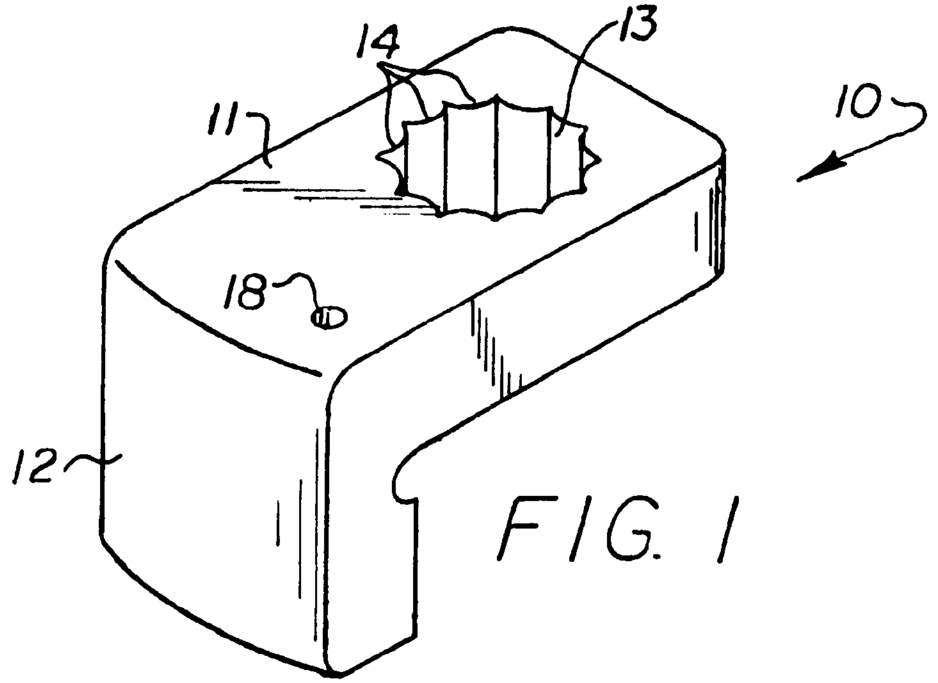
FIG. 1 is an isometric view of an anti-rotation clip in accordance with the present invention, showing the top, one end and one side.
Figure 2:
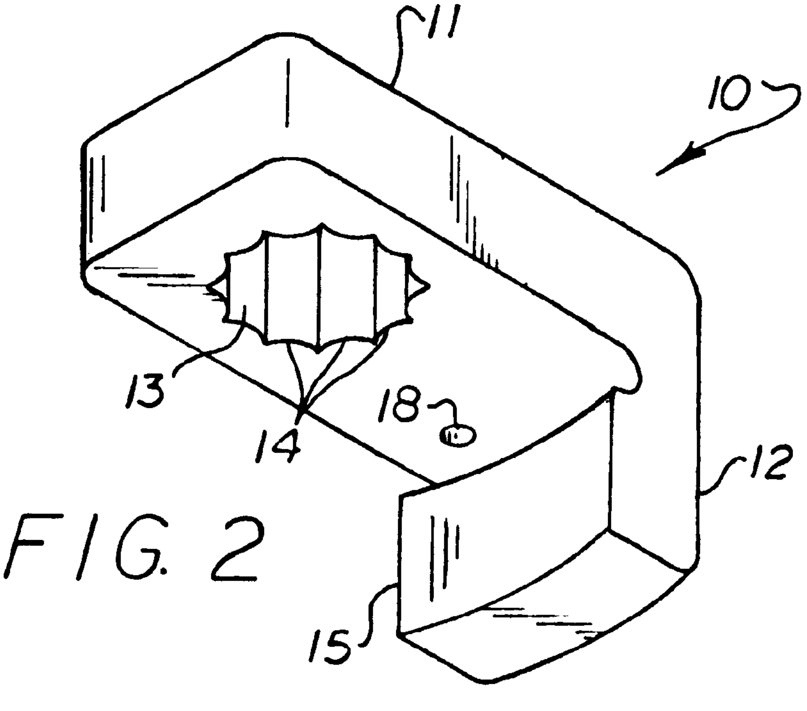
FIG. 2 is an isometric view of the anti-rotation clip of FIG. 1, showing the bottom, and the end and side opposite that shown in FIG. 1.
Figure 3:
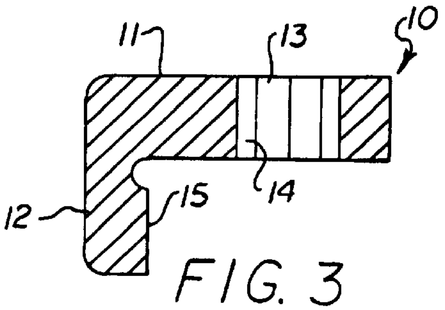
FIG. 3 is a cross sectional view through the anti-rotation clip taken along line 3—3 of FIG. 1.

Referring to the drawings by numerals of reference, there is shown in FIGS. 1, 2, and 3, an anti-rotation clip 10 for installing and removing nuts and bolts in accordance with the present invention. The anti-rotation clip 10 is a generally L-shaped member having a flat generally rectangular horizontal portion 11 and a vertical arcuate portion 12 extending perpendicular thereto at one end of the horizontal portion.

A polygonal opening 13 extends vertically through the horizontal portion 11 and has a plurality of discrete angled sides 14 configured to engage the sides of a polygonal nut or bolt head. In the illustrated example, twelve sides are shown, however, it should be understood that the opening 13 may have a greater or lesser number of sides, depending upon the type of nut or bolt head which is to be retained.

The perpendicular arcuate portion 12 has an inner facing curved surface 15 spaced a predetermined distance from the opening 13. Optionally, the inner facing surface 15 may be provided with a knurled surface finish.

Figure 4:
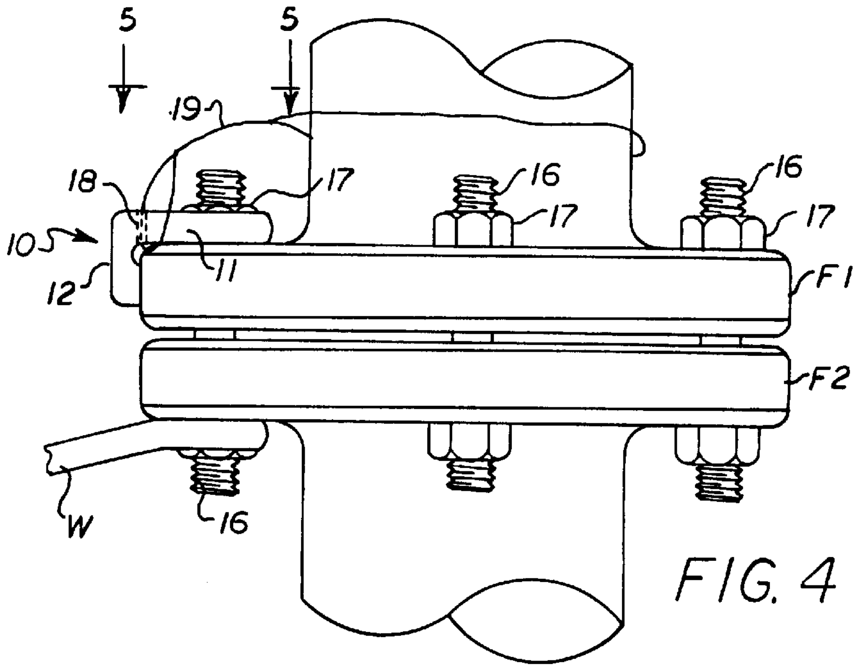
FIG. 4. is an elevation view showing the anti-rotation clip installed on a nut of a studded flange connection.
Figure 5:
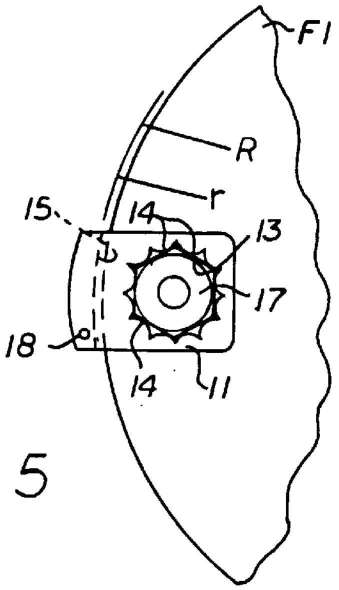
FIG. 5 is a top plan view of the anti-rotation clip installed on-a nut of a studded flange connection taken along line 5—5 of FIG. 4.

Referring additionally to FIGS. 4 and 5, the anti-rotation clip 10 is shown installed on a conventional studded flange connection wherein studs 16 having threaded ends extend through the bolt holes of the mating flanges F1, F2, and nuts 17 are threadedly engaged on the threaded ends of the studs. It should be understood that the anti-rotation clip 10 may also be used with a conventional bolted flange connection wherein the threaded shank of a bolt extends through the bolt holes of the mating flanges and has a polygonal bolt head at one end and a polygonal nut threadedly engaged on the opposed end.

The clip 10 may also be provided with a small hole 18 through which a tether cable or cord 19 passes with the other of the tether secured to or around the neck portion of one of the flanges of the flanged connection to maintain it in close vacinity of the flanged connection.

The anti-rotation clip 10 is installed by placing the opening 13 in its horizontal portion 11 onto the bolt head or nut 17 to be retained with the inner facing curved surface 15 of the vertical arcuate portion 12 extending closely adjacent to the outer circumference of the flange F1. As best seen in FIG. 5, the radius of curvature "R" of the inner facing curved surface 15 is slightly greater than the radius of curvature "r" of the flange F1 to compensate for variations dimensional tolerances of the flange.

After the anti-rotation clip 10 has been installed, a wrench W is placed onto the opposed bolt head or nut. As the wrench W is rotated, the anti-rotation clip 10 will swing through a very small arc until one end of the curved surface 15 engages the outer circumference of the flange F1 to prevent rotation of the retained bolt head or nut 17, while sufficient torque is applied to rotate the opposed bolt head or nut.

Figure 6:
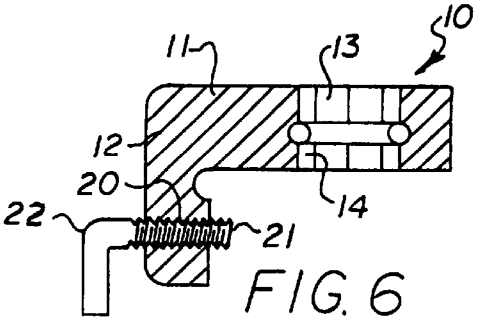
FIG. 6 is a cross sectional view through the embodiment of FIGS. 1–3 having a threaded tool installed in its vertical arcuate portion to facilitate removal of the clip from the flange.

FIG. 6 shows a modification of the anti-rotation clip 10 wherein the vertical arcuate portion 12 is provided with a threaded bore 20 which receives the threaded shank 21 of an L-shaped release tool 22. The L-shaped tool 22 may be used to facilitate disengagement of the anti-rotation clip 10 in the event that it becomes "jammed" against the outer circumference of the flange after it has swung through the small arc and the opposed bolt head or nut, has been rotated to tighten or loosen the retained bolt head or nut. This is accomplished by rotating the L-shaped tool 22 to move it inwardly until the inward facing end of its shank 21 engages the outer circumference of the flange F1 and then continuing rotation until the jammed circular surface 15 is pulled outwardly sufficient to release it. The tool 22 can then be rotated to retract it and remove the clip 10 from the retained bolt head or nut.

Figure 7:
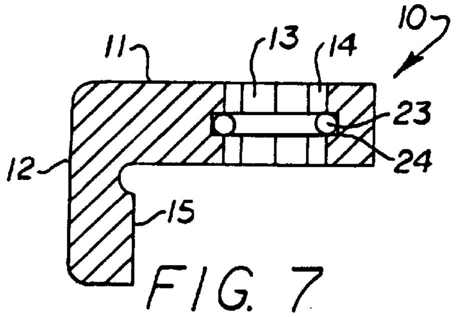
FIG. 7 is a cross sectional view through a modification of the anti-rotation clip having a nut gripping ring element in its opening.

FIG. 7 shows a modification of the anti-rotation clip 10 wherein a ring 23 is installed in a ring groove 24 formed in the interior of the polygonal opening 13 to facilitate retaining a bolt head or nut in the clip after the retained nut has been removed from the stud or bolt shank. The ring 23 may be a resilient O-ring, garter spring, or a segmented ring, which in a relaxed state has an interior diameter slightly less than the outer periphery of the bolt head or nut to be retained. In this modification, as the flat horizontal portion 11 of the anti-rotation clip 10 is installed onto the bolt head or nut to be retained, the ring 23 will engage the outer periphery of the retained bolt head or nut and expand radially outward and thereafter resiliently contract to grip and retain the bolt head or nut in the opening 13 after it has been removed from the stud or bolt shank. After the bolt head or nut has been removed, it may be manually pushed or pulled from the opening.

Figure 8:
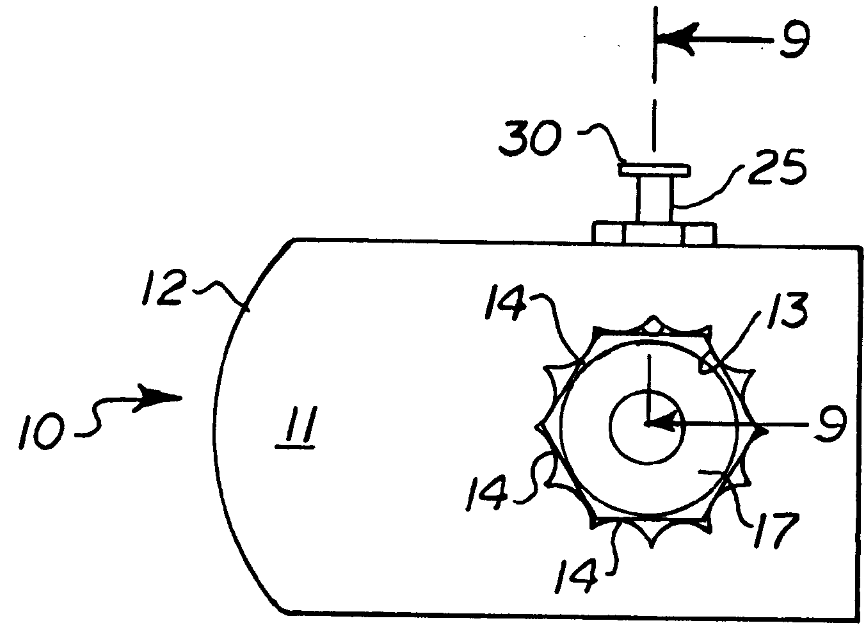
FIG. 8 is a top plan view of another modification of the anti-rotation clip having a plunger type nut gripping element extending into its opening.
Figure 9:
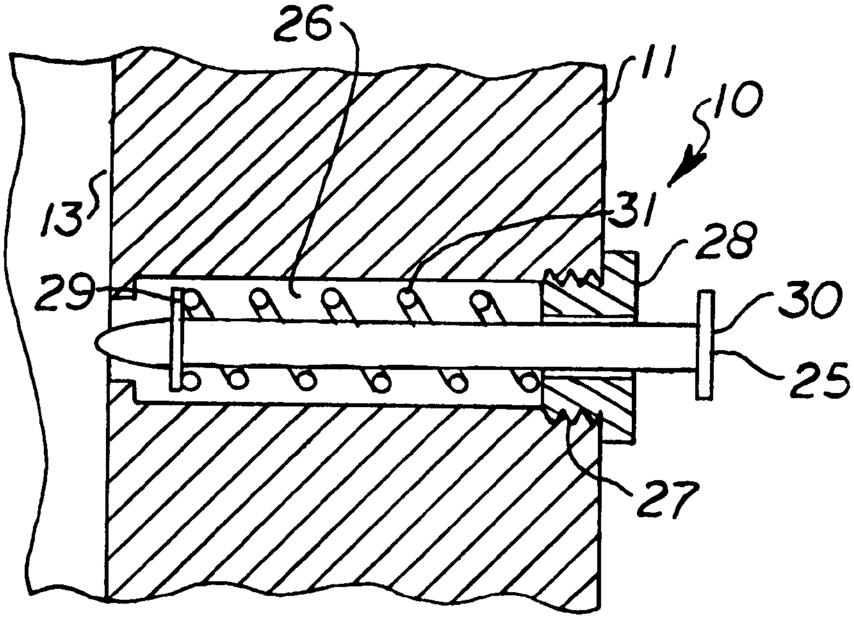
FIG. 9 is a cross sectional view through the anti-rotation clip of FIG. 8 taken along lines 9—9 of FIG. 8 showing the plunger type nut gripping element.

FIGS. 8 and 9 shows another modification of the anti-rotation clip 10 wherein a plunger 25 is used to facilitate retaining a bolt head or nut in the clip after the retained nut has been removed from the stud or bolt shank. In this modification, a bore 26 extends laterally outward from the interior of the opening 13 through one side of the flat horizontal portion 11 and has a threaded portion 27 at its outer end. A threaded plug 28 is threaedly engaged in the threaded portion 27. The rod-like plunger 25 extends slidably through the plug 28 and has a retaining snap ring 29 installed near its inner facing end and an enlarged head 30 at its outer end. A compression spring 31 is installed on the plunger and has one end engaged on the snap ring 29 and its opposed end on the inward facing end of the plug 28.

The spring 31 urges the inward facing end of the plunger 25 a short distance into the opening 13. As the flat horizontal portion 11 of the anti-rotation clip 10 is installed onto the bolt head or nut to be retained, the inward facing end of the plunger 25 will engage a flat surface of the retained bolt head or nut and move outwardly and thereafter resiliently grip and retain the bolt head or nut in the opening after it has been removed from the stud or bolt shank due to the spring pressure. After the bolt head or nut has been removed, the plunger 25 may be retracted manually to release the bolt head or nut from the opening.

While this invention has been described fully and completely with special emphasis upon preferred embodiments, it should be understood that within the scope of the appended claims the invention may be practiced otherwise than as specifically described herein.

We claim:

1. The combination of an anti-rotation clip and a flanged connection having an associated polygonal nut-like member with a vertically opposed bolt head or nut connected therewith to facilitate tightening or loosening of the nut-like member and eliminate the need to use two wrenches for tightening or loosening the nut or bolt, the combination comprising:

a unitary generally L-shaped member having a horizontal portion and an integral vertical portion at one end thereof extending generally perpendicular thereto;

a polygonal opening extending vertically through said horizontal portion having a plurality of discrete angled sides configured to surround and engage the sides of the polygonal nut-like member;

said vertical portion having a concave curved inner surface facing said opening and spaced a predetermined distance therefrom sufficient to be received in generally radially spaced relation closely adjacent to the peripheral surface of a flange of the flanged connection with which the nut-like member is associated, said curved surface having a radius of curvature greater than the radius of curvature of said flange peripheral surface; wherein said opening is placed onto the polygonal nut-like member to surround and engage the sides thereof with said curved surface disposed in generally radially spaced relation closely adjacent to the peripheral surface of said associated flange so as to engage said peripheral surface and prevent rotation of said surrounded nut-like member when torque is applied to the vertically opposed bolt head or nut connected with said surrounded nut-like member.

2. The combination according to claim 1, wherein said horizontal portion is a flat generally rectangular configuration.

3. The combination according to claim 1, wherein said vertical portion inner facing surface is spaced a sufficient distance from said opening to provide clearance between said peripheral surface of said associated flange and to engage said peripheral surface after pivoting a short distance about the vertical axis of said nut-like member when torque is applied to said vertically opposed bolt head or nut connected with said surrounded nut-like member.

4. The combination according to claim 1, wherein said curved surface has a knurled surface finish.

5. The combination of an anti-rotation clip and a flanged connection having an associated polygonal nut-like member with a vertically opposed bolt head or nut connected therewith to facilitate tightening or loosening of the nut-like member and eliminate the need to use two wrenches for tightening or loosening the nut or bolt, the combination comprising:

a generally L-shaped member having a horizontal portion and an integral vertical portion at one end thereof extending generally perpendicular thereto;

a polygonal opening extending vertically through said horizontal portion having a plurality of discrete angled sides configured to surround and engage the sides of the polygonal nut-like member;

said vertical portion having an inner surface facing said opening and spaced a predetermined distance therefrom sufficient to be received in generally radially spaced relation closely adjacent to the peripheral surface of a flange of the flanged connection with which the nut-like member is associated; and a manually operated release tool extending extendibly and retractably through said vertical portion and having an end engageable with said peripheral surface of said flange; wherein said opening is placed onto the polygonal nut-like member to surround and engage the sides thereof with said vertical portion disposed in generally radially spaced relation closely adjacent to the peripheral surface of said flange so as to engage said peripheral surface and prevent rotation of said nut-like member when torque is applied to the vertically opposed bolt head or nut connected with said surrounded nut-like member; and said release tool is selectively extended to engage said peripheral surface of said flange to pull said vertical portion outward therefrom to facilitate disengagement therewith in the event that said vertical portion becomes lammed against said peripheral surface.

6. The combination according to claim 5, further comprising gripping means in said opening for engaging the periphery of said nut-like member when said opening is placed onto said nut-like member to releasably retain said nut-like member in said opening after it has been removed from the flanged connection and thereafter allow said nut-like member to be released by pulling or pushing it from said opening.

7. The combination according to claim 6, wherein said gripping means comprises a radially expandible and contractable ring disposed in said opening sized to engage and grip the outer periphery of said nut-like member when said opening is placed onto said nut-like member.

8. The combination of an anti-rotation clip and a flanged connection having an associated polygonal nut-like member with a vertically opposed bolt head or nut connected therewith to facilitate tightening or loosening of the nut-like member and eliminate the need to use two wrenches for tightening or loosening the nut or bolt, the combination comprising:

a generally L-shaped member having a horizontal portion and an integral vertical portion at one end thereof extending generally perpendicular thereto;

a polygonal opening extending vertically through said horizontal portion having a plurality of discrete angled sides configured to surround and engage the sides of the polygonal nut-like member;

said vertical portion having an inner surface facing said opening and spaced a predetermined distance therefrom sufficient to be received in generally radially spaced relation closely adjacent to the peripheral surface of a flange of the flanged connection with which the nut-like member is associated; and a spring biased plunger having a radially extendible and retractable end protruding into said opening to engage a flat surface of said nut-like member when said opening is placed onto said nut-like member; wherein said opening is placed onto the -polygonal nut-like member to surround and engage the sides thereof with said vertical portion disposed in generally parallel spaced relation closely adjacent to the peripheral surface of said flange so as to engage said peripheral surface and prevent rotation of said nut-like member when torque is applied to the vertically opposed bolt head or nut connected with said nut-like member; and said plunger releasably retains said nut-like member in said opening after it has been removed from the flanged connection and thereafter allows said nut-like member to be released by pulling or pushing it from said opening.

* * * * *